June 7, 1966  D. D. MacKENZIE  3,254,673
QUICK DISCONNECT COUPLING WITH VALVE
Filed July 26, 1962  4 Sheets-Sheet 1
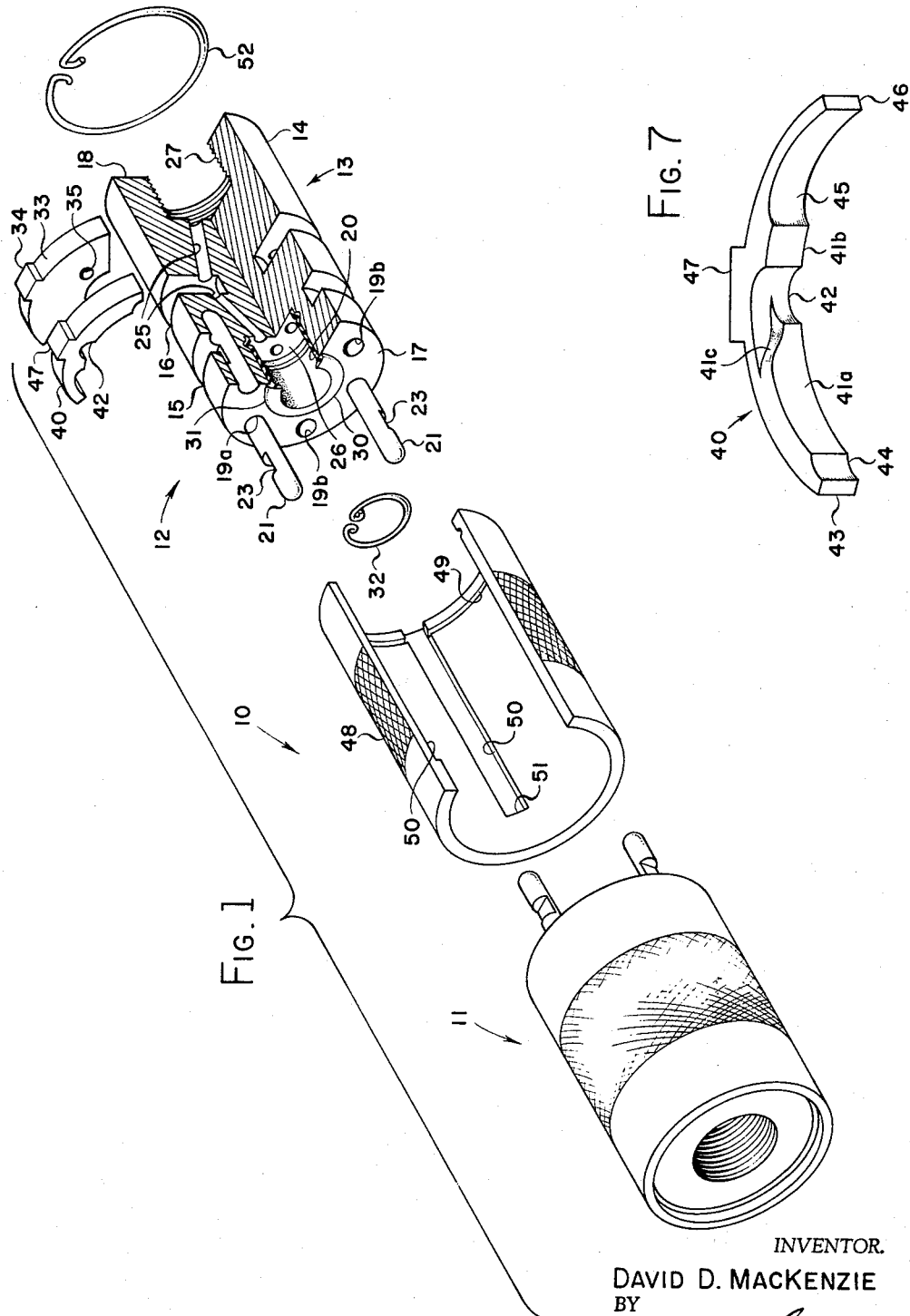
INVENTOR.
DAVID D. MacKENZIE
BY
*George C. Sullivan*
Agent

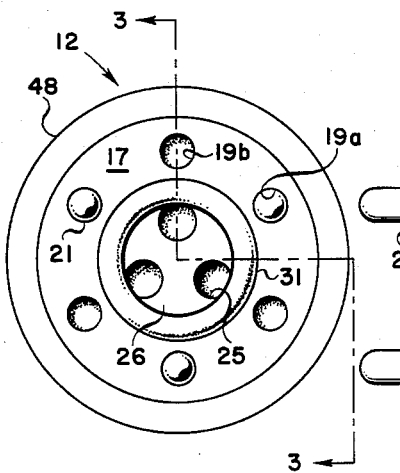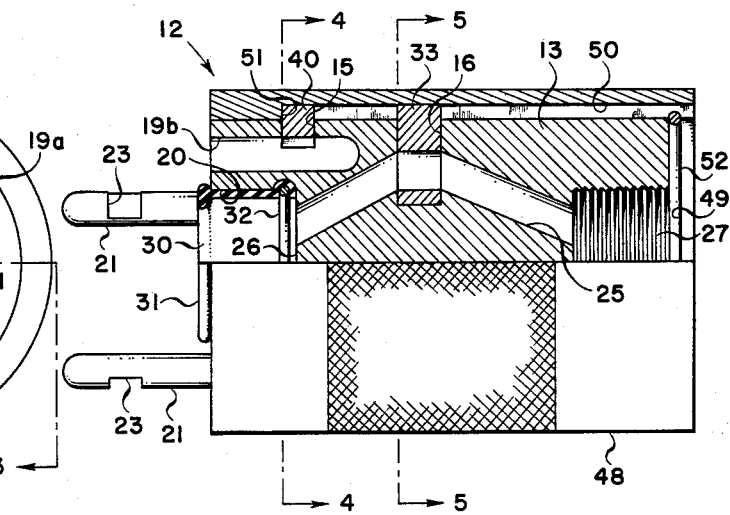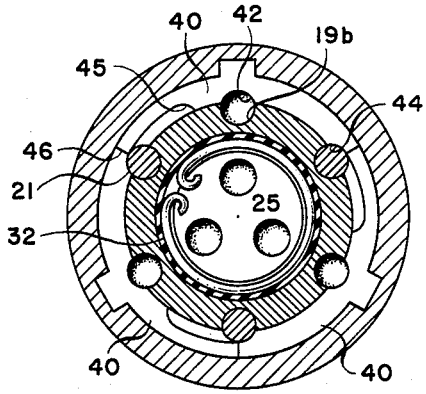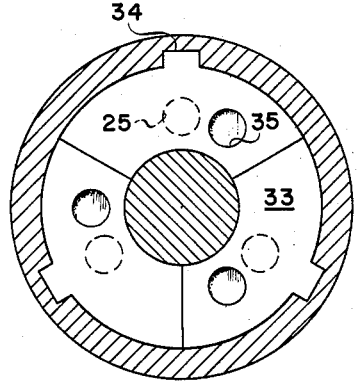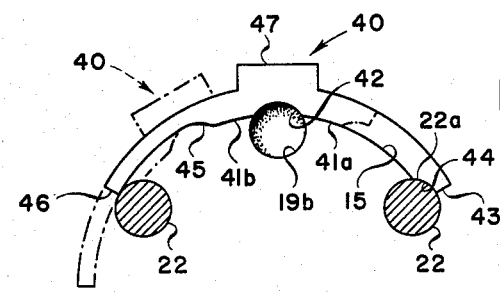

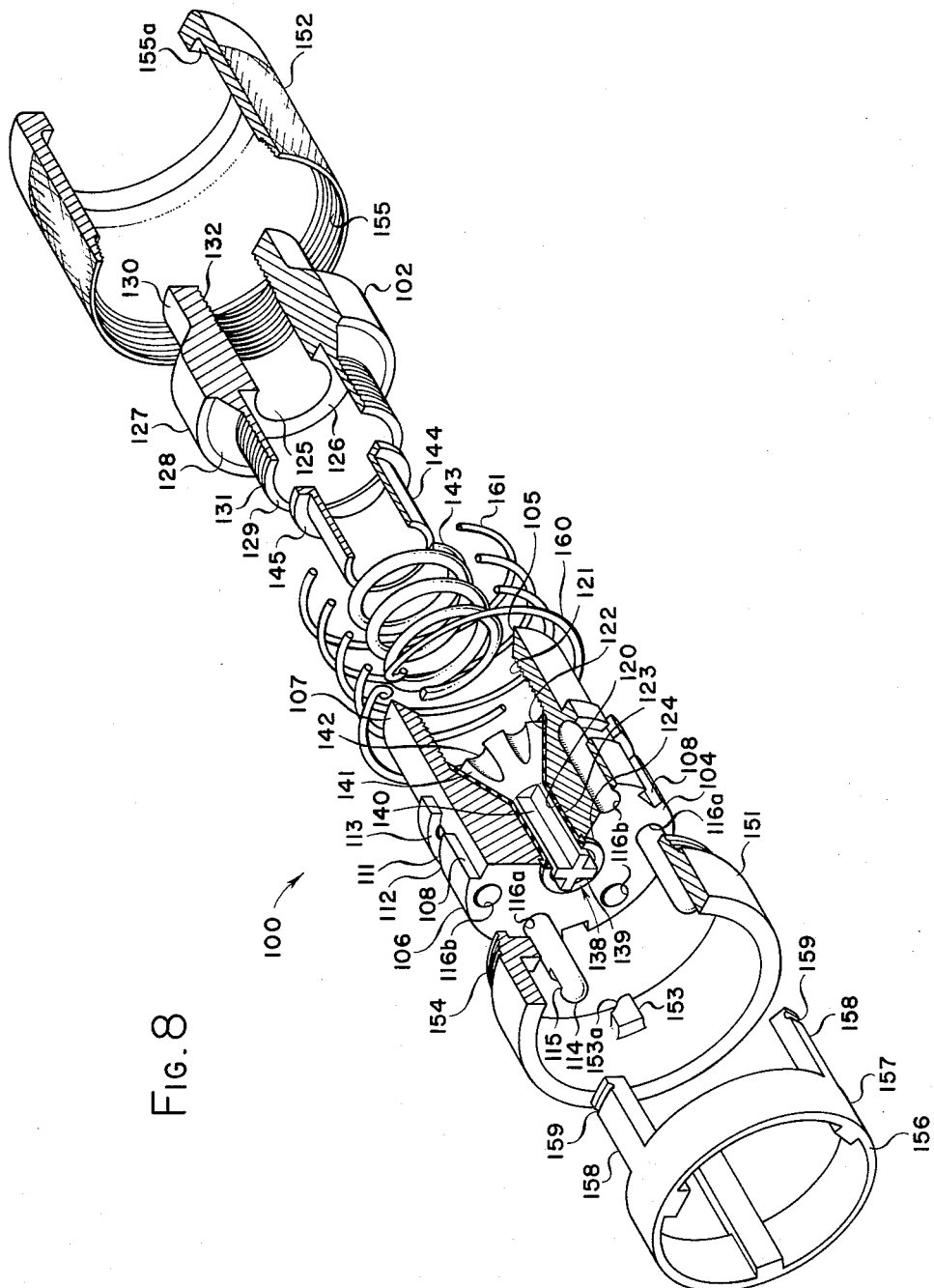

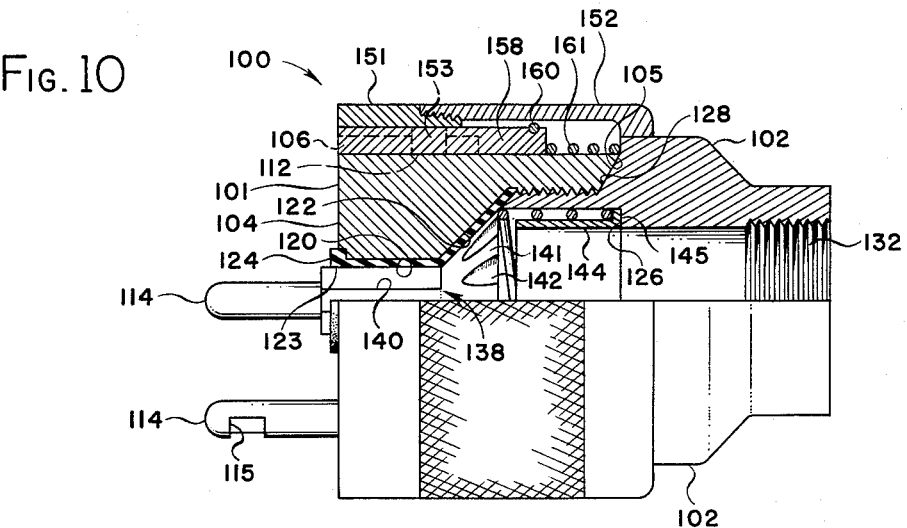
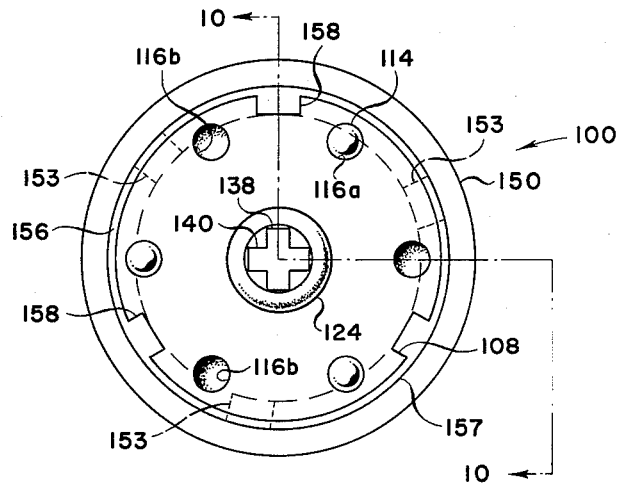
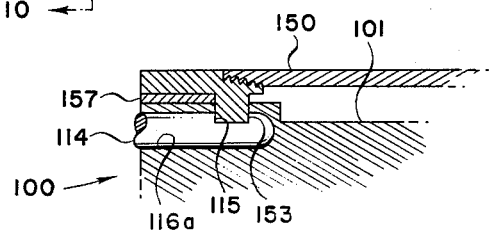

United States Patent Office 3,254,673
Patented June 7, 1966

3,254,673
QUICK DISCONNECT COUPLING WITH VALVE
David D. MacKenzie, Atlanta, Ga., assignor to Lockheed Aircraft Corporation, Burbank, Calif.
Filed July 26, 1962, Ser. No. 212,611
12 Claims. (Cl. 137—614.02)

This invention relates to a quick disconnect coupling, and more particularly to a quick disconnect self-sealing and self-locking coupling having identical mating parts.

Present quick disconnect hose couplings use dissimilar parts; and consequently when it is desired to join similar hose coupling parts, an adapter must be used. One disadvantage of such prior art hose couplings is that at least two complete sets of tooling are required to form the hose coupling parts and an additional set of tooling is required to form the adapter. In addition to the substantial tooling costs of present hose couplings, the stocking of hose couplings and the various replacement parts therefor amounts to a substantial investment in terms of time, space, money and record keeping. From a practical standpoint, the most important limitation of present hose couplings having dissimilar parts is encountered in the field when hoses required to be interconnected are found to be provided with identical hose coupling parts that are not connectable necessitating the time-consuming job of locating an adapter or a compatible hose coupling part. The limitations and disadvantages of such prior art hose couplings are eliminated in accordance with this invention.

The hose coupling of this invention is formed of identical mating parts; therefore, one tooling setup is required for manufacture of such hose couplings, the stocking of hose coupling parts and replacement parts is kept to a minimum, and there are no connection problems in the field. To facilitate the interconnection of hose coupling parts in the field, each is provided with a valve closing the coupling flow passage prior to interconnection of the coupling parts; and fast action locking devices are provided for facilitating the quick connection of the hose coupling parts. Additionally, to prevent hose coupling leakage, the hose coupling parts when interconnected are self-sealing.

Accordingly, it is an object of this invention to provide a quick disconnect hose coupling having identical mating parts which are self-locking.

Another object of this invention is to provide a self-locking and self-sealing quick disconnect hose coupling having identical mating parts.

Still another object of this invention is to provide a quick disconnect coupling having identical mating parts with interengaging connecting elements and locking elements for locking the connector elements in their interengaged position.

A further object of this invention is to provide a coupling having identical mating parts each comprising a flow passage, at least one valve cooperating with the flow passage, at least one connector, a lock cooperating with the connector of a mating coupling part, and apparatus for actuating the valve and the lock.

A still further object of this invention is to provide a cylindrical hose coupling element having a valve, a lock for locking the coupling element relative to another coupling element, and apparatus for concomitantly actuating the valve between closed and open positions and the lock between locked and unlocked positions, respectively.

Another object of this invention is to provide a cylindrical quick disconnect coupling element having a body, at least one connecting element, at least one locking element operating in a circumferential groove in the body relative to the connecting element of a cooperating coupling element, at least one flow passage through the body, a valve disposed in the flow passage, and apparatus for simultaneously actuating the locking element and the valve.

It is another object of this invention to provide a coupling having identical mating coupling elements, each including sockets and pins having transverse slots therein, a circumferential groove in each coupling element intersecting the sockets thereof, and a locking element sliding within the groove along a tapered surface relative to the slot of a pin fitting into a corresponding socket to draw the pin tightly into the socket.

Another object of this invention is to provide a coupling having identical mating coupling elements each having a front coupling face, a pin protruding from the face, a socket formed in the face, a flow passage through the coupling element intersecting the coupling face, a seal surrounding the flow passage seated on the face, and a lock for locking the coupling faces of mating coupling elements together with their flow passages in sealed fluid communication.

A further object of this invention is to provide a quick disconnect hose coupling having identical mating parts, at least one valve in each of the mating parts, and positive stops indicating fully closed and open valve positions.

Still a further object of this invention is to provide a longitudinally directed hose coupling element having a connector, a flow passage, valve elements and locking elements operatively assembled into circumferential grooves in the coupling element in cooperating relation to the connector and the flow passage of a cooperating coupling element, and apparatus for actuating the valve elements and the locking elements.

A still further object of this invention is to provide a coupling having identical mating coupling elements having interengaging pins and sockets formed in front coupling faces thereof, flow passages through the elements, a retractable valve disposed in each flow passage, apparatus for locking the pins and sockets in their interengaged position, and apparatus for opening the valve.

Another object of this invention is to provide a coupling element having a front coupling face, pins and sockets formed in a front coupling face thereof and a retractable pin protector surrounding the pins.

Further objects and advantages of this invention will become apparent from the following description taken in connection with the accompanying drawings in which:

FIGURE 1 is a pictorial view of one embodiment of two identical mating coupling elements of this invention, partially exploded and partially in section;

FIGURE 2 is an end view of one of the coupling elements shown in FIGURE 1;

FIGURE 3 is a sectional view taken along line 3—3 of FIGURE 2;

FIGURE 4 is a sectional view of a coupling element in a plane located by line 4—4 of FIGURE 3;

FIGURE 5 is a sectional view similar to FIGURE 4 in a plane located by line 5—5 of FIGURE 3;

FIGURE 6 is a diagrammatic view showing the operation of a locking element of the coupling element of FIGURE 1;

FIGURE 7 is a view showing the details of the locking element of FIGURE 6;

FIGURE 8 is a pictorial view of one of the identical mating coupling elements of another embodiment of the invention;

FIGURE 9 is an end view of the coupling element of FIGURE 8;

FIGURE 10 is a sectional view taken along line 10—10 of FIGURE 9; and

FIGURE 11 is a partial sectional view showing the details of a pin locked within a corresponding socket of the coupling element shown in FIGURE 8.

Generally stated, this invention comprises a quick disconnect hose coupling having identical mating elements each having a coupling body; a flow passage through the body; a compression seal about the flow passage; mating interengaging connecting elements; locking apparatus cooperating with the connecting elements; valves cooperating with the flow passage; an actuator for actuating the locking apparatus for locking the mating connecting elements in their interengaged position, an actuator for positioning the valves between closed and open positions, and apparatus for positioning the compression seals in sealed engagement.

More particularly, the drawings in FIGURE 1 show in one embodiment of this invention a coupling 10 comprising a pair of identical mating coupling elements 11 and 12. Since the coupling elements are identical, only coupling element 12, which is shown partially exploded and partially in section, will be described in detail. Coupling element 12 comprises a coupling body 13 having a cylindrical exterior surface 14 with spaced circumferential grooves 15 and 16 formed therein and opposed planar end walls 17 and 18. End wall 17, which may properly be called a front coupling face (best seen in FIGURES 1 and 2), has a large central counter bore or chamber 20 in axial alignment with the longitudinal centerline of the coupling body 13 and a plurality of bores 19a and 19b which are equally and alternately spaced in a circle radially outwardly from the counter bore 20 in face 17. Bores 19a and 19b are in longitudinal alignment with the longitudinal centerline of coupling body 13. Each of the bores 19a and 19b intersects the bottom of groove 15 and extends a slight distance beyond groove 15. The interior ends of identical pins 21 are preferably shrunk fit into the bores 19a such that their interior ends intersect and extend beyond groove 15 and an arcuate cylindrical sidewall portion 22 (FIGURE 6) of each of the three pins protrudes into the groove 15. Slots 23 are formed in the radially outer face of each of the pins proximate the protruding terminal end of the pin. The remaining alternate bores 19b are adapted to receive the pins of the identical mating coupling 11 and may properly be called sockets. Also, the pins and sockets may properly be called connecting means.

Three symmetrically spaced bores or fluid flow passages 25 extend from the interior face 26 of chamber 20 in the longitudinal direction of the coupling body 13 and intersect the groove 16 substantially intermediate of its depth. Flow passages 25 continue from groove 16 and intersect the interior end of a threaded counter bore 27 which is adapted to threadably receive a hose connection. A hollow cylindrical seal 30, which is slightly longer than chamber 20, is snugly fit into the chamber such that its interior end abuts the chamber face 26 and its exterior annular end 31 is seated on the front face 17 of the coupling body 13 and forms a compression sealing lip. A snap ring 32 holds the seal 30 in place by compression within the chamber 20. In its installed position the snap ring 32 is located at the bottom of the chamber 20, close to face 26, so that it will not create undue turbulence within the chamber.

The coupling body 13 is provided with three identical arcuate Teflon valve elements 33 (FIGURES 1 and 5) which are positioned with their lower arcuate portions in preferably running fit relation to the bottom of coupling body groove 16 (FIGURE 3). Each valve element has a substantially rectangular actuating means or protuberance 34 extending from its peripherally outer surface in alignment with its radial central axis and a transverse valve port 35 arcuately offset 30° from its radial central axis. Each valve port is of a slightly larger diameter than a corresponding flow passage 25. Valve elements 33 are of wedge-shaped cross section and may be slightly wider at their peripheral outer arcuate edges than at their peripheral inner arcuate edges to make possible their easy insertion into groove 16, which may also be of wedge-shaped cross section. When inserted into groove 16, the valve elements 33 surround the coupling body 13 and act as a continuous or one rotary ring when actuated.

Each of the flow passages 25 is bisected by the radial central axis of each valve element 33 when the valve is in the fully closed position as shown in FIGURE 5. Counterclockwise rotation of the valve elements through an angle of 30° will bring the valve ports 35 into axial alignment with each of the flow passages 25. Ports 35 are of slightly larger diameter than the corresponding flow passages 25 to compensate for any misalignment of the ports and passage, thus permitting the reduction of costly manufacturing tolerances.

The coupling body 13 is additionally provided with locking means comprising three identical arcuate locking elements or segments 40 (FIGURES 1 and 6), which are positioned with their lower arcuate locking and guiding portions 41a and 41b guidably received within coupling body groove 15 (FIGURE 3). Each locking element 40, one of which is shown in detail in FIGURES 6 and 7, has a transverse arcuate cutout 42 centrally of its lower arcuate locking and guiding portions 41a and 41b which has a slightly larger radius than the locking pins 21. The locking portions 41a and 41b extend a small arcuate distance less than 30° on either side of cutout 42 and are terminated at their opposed ends by cutouts 44 and 45, respectively, each having a radius equal to that of a pin 21. From cutout 45 to the terminal end 46 thereof, each locking element 40 is of reduced radial thickness such that its radial arcuate inner surface normally slidingly engages the arcuate wall 22 of a pin 21, which normally projects into groove 15. Locking portions 41a and 41b may both be of a thickness throughout their arcuate length to engage the sidewalls of groove 15; however, locking portion 41a is preferably tapered along the surface 41c to be thick at its terminus 43 and thinnest at cutout 42, FIGURE 7, to cam a pin 21 tightly into a corresponding socket 19b and to draw the lips 31 of the mating flow passage seals into sealing engagement. For actuation of the locking elements 40, each locking element has a substantially rectangular actuating means or protuberance 47 extending from its peripherally outer surface in radial alignment with cutout 42.

Locking element 40 is shown in its unlocked position in solid line in FIGURE 6. When the locking element 40 is unlocked, cutout 44 abuts pin 21 which acts as a positive stop; cutout 42 is in alignment with socket 19b and forms an arcuate part of the wall thereof so that a corresponding pin of the mating coupling may be inserted into the socket; and the inner surface of the locking element near terminal end 46 resting upon pin 21. Locking element 40 is shown in its locked position in dotted line in FIGURE 6. When the locking element 40 is locked, cutout 45 abuts pin 21, which acts as a positive stop; cutout 42 is positioned counterclockwise of socket 19b; and the locking portion part 41a protrudes into socket 19b.

Pins 21 of the mating couplings fit into corresponding sockets 19b of their mating coupling such that the slots 23 in each of the pins are in alignment with the grooves 15 so that the locking portions 41a of the locking elements, when actuated clockwise, will slide into the slots in the pins and hold the coupling elements locked together. More specifically, the locking elements 40, when actuated clockwise, slide into the slots in the pins 21; and the cam surfaces 41c thereof engage the sidewalls of the slots to draw or cam the pins tightly lockingly into the corresponding sockets.

A thin walled hollow cylindrical actuator means 48 (FIGURE 1) having a smooth interior wall and a knurled exterior wall is provided to actuate both the locking elements 40 and the valve elements 33. Actuator 48 is slightly longer than coupling body 13 and its interior wall is of slightly larger diameter than the exterior diameter of the coupling body. Interiorly, adjacent one end thereof, the actuator 48 is provided with a circumferential groove 49, and three equally spaced longitudinal grooves 50 are formed in the interior wall of the actuator. The grooves 50 are open at one end and form a seat 51 with the interior wall of the actuator at the other end. Grooves 50 are rectangularly dimensioned such that the rectangular actuating protuberances 34 and 47 of the valve elements and locking elements will snugly slidingly fit therein. Also, grooves 50 are tapered to be slightly deeper at their open ends than at their closed ends so that the valve elements 40 will be compressed into snug sealing engagement with the sidewalls of the circumferential groove 16 in which they fit.

In operation, the actuators 48 of a pair of mating coupling elements 11 and 12 are first rotated counterclockwise to insure that each locking element 40 is unlocked with its cutout 42 in alignment with a corresponding socket 19b and its cutout 44 abutting the surface 22 of a pin 21. Next, the pins 21 of the coupling elements are inserted into the sockets 19b of each other with the slot 23 in each pin in alignment with the locking portion 41a of a corresponding locking element 33. Then the actuator 48 of each coupling element is rotated approximately 30° clockwise until the cutout 45 in each locking element abuts the surface 22 of a pin 21. In response to the rotation of the actuators 48, each locking element 40 slides in the groove 15 in which it is mounted and the tapered surface 41c of the locking portion 41a thereof cams against the side wall of the pin slot 23 with which it cooperates to draw the pin 21 tightly into the socket 19b to thereby draw the front faces of the mating coupling elements into juxtaposition such that the lips 31 of seals 30 are sealingly engaged by one another. Concomitantly, the valve elements 33 are actuated by the actuators 48 from a closed position to an open position. It will be appreciated from the foregoing that the locked and unlocked positions of the locking elements 40 and the closed and open positions of the valves 33 are both defined by the abutment of cutouts 44 and 45 of the locking elements 40 with the side wall portions 22 of the end of the pins 21.

Referring now to FIGURES 8 to 11 and more particularly to FIGURE 8, therein shown, partially exploded and partially in section, is one of the identical mating coupling elements 100 of an alternate embodiment of the invention. Each coupling element 100 comprises a cylindrical coupling body having a front portion 101 and a rear portion 102. Front body portion 101 has a front coupling face or end wall 104 and an inwardly tapered rear end wall 105. The exterior cylindrical surface of the front body portion 101 is divided into a front section 106 and a reduced diameter rear section 107. Three equally spaced longitudinal slots 108 are formed in the front section 106, and the bottom surface of each slot is flush with the surface of the rear section 107. Also, a circumferential groove 111 having side walls 112 and 113 is formed in front section 106. Six bores 116a and 116b are alternately located in the front wall 104, FIGURES 8 and 9. These bores are equally spaced in a circle radially outwardly from the axial centerline of the coupling body and are in longitudinal alignment with the axial centerline of the coupling body. Three pins 114 each having a transverse slot 115 (FIGURE 10) formed in their cylindrical side wall proximate their terminal end are shrunk fit into bores 116a in the body face 104 such that the slots 115 face radially outwardly. The remaining bores 116b are adapted to receive the pins of the identical mating coupling and may properly be called sockets. Sockets 116b intersect the bottom of groove 111 and extend a short distance therebeyond. The pins 114 and sockets 116b may properly be called connecting means.

A central axial bore 120 is formed in the front body portion 101 of the coupling body. Bore 120 is counterbored from the rear end wall 105 into the body portion approximately one-third the longitudinal length thereof. This counter bore 121 is provided with screw threads and is tapered into the bore 120 by a frustro conical surface 122, which surface acts as a valve seat. Bore 120, counter bore 121 and the area encompassed by the frustro conical surface 122 define a flow passage through the coupling body. Hollow cylindrical seal 123 having a lip portion 124 is snugly fitted against the cylindrical side wall of bore 120 and frustro conical surface 122 with the lip 124 seated against the front coupling face 104 of the valve body portion 101.

Hollow cylindrical rear body portion 102 has a cylindrical through bore 125 having a central interior collar forming an annular seat 126. Exteriorly, the body portion 102 has a central collar portion 127 which is undercut slightly on its forward end to form an annular seat 128. On both sides of the collar 127 the forward and aft ends 129 and 130 of rear body portion 102 are of reduced exterior diameter. The front end 129 of body portion 102 is provided with exterior screw threads 131 and the aft end 130 is provided with interior screw threads 132. Interconnection of body portions 101 and 102 is achieved by screwing the threaded end 129 of body portion 102 into the threaded counter bore 121 of body portion 101. A retractable valve element 138 is operably positioned within the flow passage through the coupling body. Valve 138 has an elongate stem portion 139 having four elongate symmetrically related cutouts 140 therein. Stem portion 139 merges into a frustro-conical valve seat portion 141 which has the same slope as the frustro-conical surface 122 of the valve body. The large end of the valve seat portion 141 is provided with a plurality of preferably six arcuate cutouts or scallops 142. Valve 138 is received in the valve body flow passage with its valve seat portion 141 in mating relation with frustroconical surface 122 against seal 123 and its stem received in the bore 120.

When the coupling element 100 is disconnected from a mating coupling element, a coil spring 143 biases the valve element forward in the flow passage such that the end of the stem 139 protrudes from bore 120 and the valve portion 141 is in engagement with the valve seat 122 of the valve body through the intermediary of seal 123. Coil spring 143 is constrained from lateral displacement by a spring retaining sleeve 144 having an outwardly projecting annular flange 145.

Spring retainer 144 additionally performs the important function of serving as a position stop defining the fully open position of the valve and consequently the locked position of the locking means, as will presently more clearly appear. Coil spring 143 reacts against the annular flange 145 of the retaining sleeve 144 which in turn reacts against the annular seat 126 of the rear valve body portion 102. The coil spring 143 and spring retainer 144 comprise a coil spring assembly.

Coupling 100 is provided with a two-piece hollow cylindrical actuator or actuating means 150 (FIGURES 8 and 10) comprising a front part 151 and a rear part 152. Interiorly, front part 151 is provided with locking means in the form of three equally spaced substantially rectangular locking elements or actuating protuberances 153 each of which is tapered along the surface 153a, FIGURE 8. One end 154 of the front part 151 is of reduced exterior diameter and is threaded, and the rear part 152 is interiorly threaded at its one end 155. The other interior end of the rear part 152 is provided with an annular flange or shoulder 155a. Exteriorly, the rear part is knurled to facilitate rotation of the actuator. Interconnection of front and rear actuator parts 151 and 152 is accomplished by threading the threaded end 155 of the rear part 152 onto the threaded end 154 of the front part 151.

Coupling element 100 is also provided with a pin protector 156 comprising a hollow cylindrical protector portion 157 having an internal diameter which is slightly greater than the exterior diameter of the front part 106 of the front valve body portion 101. Three equally spaced guide legs 158, FIGURE 8, are secured by suitable means to the interior surface of the protector portion 157. Legs 158 extend from the protector portion in longitudinal alignment with the axial centerline thereof. Adjacent their terminal ends, the legs 158 are provided with aligned circumferential grooves 159 which are adapted to receive a snap ring 160. Legs 158 are slidably guidably received in the slots 108 in the valve body. Snap ring 160 serves to define the limits of forward extension of the pin protector, and a coil spring 161 acting against the terminal ends of the legs 158 and the seat 128 of valve body portion 108 maintains the pin protector normally biased forward. In the retracted position of the pin protector 156, the coil spring 161 is retracted and the protective portion 157 of the pin protector 156 surrounds the forward section 106 of the valve body portion 101, but does not appreciably protrude from the end thereof.

In operation, the actuators 150 of a pair of mating couplings 100 are first rotated counterclockwise to insure that each locking element 153 is unlocked with its sidewall loosely engaging a pin protector leg 158, which serves as a positive stop defining the unlocked position of the locking elements 153 and consequently the closed position of the valve 138. Next, the pins 114 of a pair of mating coupling elements 100 are inserted into the corresponding sockets 116b thereof until the transverse pin slots 115 are in partial alignment with groove 111. As the pins 114 and sockets 116b are interengaged, the pin protectors 156 of each of the mating coupling elements are engaged by one another and forced to retract against the biasing force of spring 161. The actuator 150 is then rotated clockwise to slide locking elements 153 within groove 111 until they lockingly engage the transverse pin slots 115. As the actuator 150 is rotated, the locking elements 153 are cammed along tapered cam surface 153a thereof to pull the pins 114 tightly and lockingly into the sockets 116b and the seal lips 123 of the mating coupling elements into sealing engagement with one another. Concomitantly, the protruding terminal ends of the stems 140 of the valve elements 138 engage one another to force each valve element 138 into a retracted position against the terminal end of the spring retainer 144 which serves as a positive stop, thus assuring that each of the mating valve elements 138 will be fully retracted to completely open the flow passage through the coupling.

While particular embodiments of the invention have been illustrated and described, it will be obvious to those skilled in the art that various changes and modifications may be made without departing from the invention and it is intended to cover in the appended claims all such modifications and equivalents as fall within the true spirit and scope of this invention.

What is claimed is:

1. Coupling means comprising: a pair of identical mating coupling bodies each having interengaging pin and socket means, locking means, and movable actuating means mounted thereon and overlying and engageable with said locking means and operable to lock said pins and sockets in their interengaged position.

2. A coupling comprising: identical mating coupling bodies, each coupling body having a flow passage arrangement therethrough, interengaging pin and socket means, locking means, valve means cooperating with said flow passage arrangement, and actuating means, said actuating means operable to position said locking means in a locked position relative to said pin and socket means when interengaged and to position said valve means between closed and open positions.

3. A coupling comprising a pair of identical mating assemblies, each of said assemblies including: a cylindrical body having a planar front face, at least one longitudinal flow passage, and a circumferential groove; a sliding lock means in said groove; actuating means carried by said body and movable relative thereto for operating said lock means; socket means in said front face and intersecting said groove; and pin means extending from said front face, said pin means of each of said assemblies fitting into the mating assembly socket means and intersecting said groove to lockingly engage said assemblies by said lock means upon movement of said actuating means relative to said body.

4. A coupling comprising a pair of identical mating assemblies, each of said assemblies including: a cylindrical coupling body having a front face, at least one longitudinal flow passage, and a circumferential groove; a sliding lock means in said groove; actuating means mounted on said body for limited relative movement and engageable with said lock means; socket means in said front face and intersecting said groove; and transverse slotted pin means protruding from said front face, said pin means of each of said assemblies fitting into the mating assembly socket means with said slot and groove in alignment, said assemblies lockingly engaged upon movement of said actuating means.

5. A coupling member assembly comprising: a cylindrical body having a front face; at least one longitudinal flow passage through said body; a circumferential groove in said body; socket means in said front face and intersecting said groove; lock means having a portion sliding in said groove relative to said socket means; means overlying and surrounding said groove and engageable with said lock means for the actuation thereof; and transverse slotted pin means extending from said front face.

6. The assembly of claim 5 including a spring biased retractable valve mounted in said flow passage.

7. A coupling member assembly comprising: a body having a front face; a flow passage through said body; pin and socket means contiguous said front face; valve means controlling said flow passage; and means simultaneously cooperating with said pin and socket means and said valve means to close and open said valve means corresponding to its cooperation with said socket means.

8. A coupling member assembly comprising: a cylindrical coupling body; three longitudinal flow passages through said body; a circumferential groove in said body intersecting each of said flow passages; a valve means for each flow passage, each valve means having a transverse port and a radially protruding actuating protuberance; and an actuator surrounding said body and having three longitudinal slots formed therein for cooperating with the actuating protuberance of each of said valve means to arcuately position said valve means between a closed position and an open position with said valve ports in alignment with said flow passages.

9. A coupling comprising a pair of identical mating assemblies, each of said assemblies including: a coupling body having at least one longitudinal flow passage, a circumferential groove, and a plurality of sockets intersecting said groove; a plurality of pins having one interior end thereof shrunk fit into alternate of said socket means and the other end having a transverse slot; locking elements sliding in said groove; and actuating means, said actuating means operative to arcuately slide said locking elements in said groove into a locking position, said interior ends of said pins acting as positive stops for said locking means defining the locked and unlocked positions thereof.

10. A quick disconnect hose coupling comprising: identical mating assemblies, each said assembly including a body, flow passage means through said body, movable valve means cooperating with the said flow passage means, a circumferential groove in said body, locking means operatively disposed in said groove, pins having transverse slots therein, and sockets; and actuating means for positioning the locking means of one coupling element into locking engagement with the slots in the pins of the mating coupling element and effecting movement of the valve means from a closed to open position.

11. The coupling of claim 10 wherein said valve means is resiliently biased with one terminal end thereof extending beyond said body and said actuating means includes means for moving said valve to open said flow passage means in opposition to said resilient biasing force.

12. A coupling member assembly comprising: a cylindrical body having a front face; at least one longitudinal flow passage through said body; a first circumferential groove in said body medially thereof; socket means in said front face intersecting said first groove; lock means having a portion sliding in said first groove relative to said socket means; means for actuating said lock means; transversely slotted pin means extending from said front face; a second circumferential groove in said body medially thereof intersecting said flow passage; actuable valve means sliding in said groove and having transverse port means therein; and means for positioning said valve means between a closed and an opened position with said port means in alignment with said flow passage, said means being concomitantly actuable with the lock actuating means aforesaid.

References Cited by the Examiner

UNITED STATES PATENTS

| | | | |
|---|---|---|---|
| 526,174 | 9/1894 | Bailey | 285—70 |
| 792,417 | 6/1905 | Houser | 285—70 |
| 1,118,107 | 11/1914 | Clasen | 285—69 X |
| 1,427,716 | 8/1922 | Bluhm | 137—625.31 |
| 2,399,525 | 4/1946 | Waag | 137—614.02 X |
| 2,819,914 | 1/1958 | Eitner | 285—70 |
| 2,907,346 | 10/1959 | Fortune | 137—601 |
| 3,000,655 | 9/1961 | Piet | 137—614.04 |
| 3,026,899 | 3/1962 | Mischanski | 137—625.31 X |
| 3,052,261 | 9/1962 | Nyberg | 137—614.04 |
| 3,060,966 | 10/1962 | Ratelband | 137—601 |

FOREIGN PATENTS 295,130   11/1916   Germany.

MARTIN P. SCHWADRON, *Acting Primary Examiner.*

ISADOR WEIL, M. CARY NELSON, *Examiners.*

J. DEATON, L. KAMPSCHROR, *Assistant Examiners.*